J. R. Hood,
Cotton Chopper.
No. 111,346.     Patented Jan. 31, 1871.

Witnesses.     Jos. R. Hood
    by
    their Attorneys.

UNITED STATES PATENT OFFICE.

JOSEPH R. HOOD, OF WEEDOWEE, ALABAMA.

IMPROVEMENT IN COTTON-CHOPPERS.

Specification forming part of Letters Patent No. 111,346, dated January 31, 1871.

*To all whom it may concern:*

Be it known that I, JOSEPH R. HOOD, of Weedowee, in the county of Randolph and State of Alabama, have invented a new and Improved Cotton-Chopper; and I do hereby declare the following to be a full, clear, and exact description of the same, reference being had to the accompanying drawings, making a part of this specification, in which—

Figure 1:
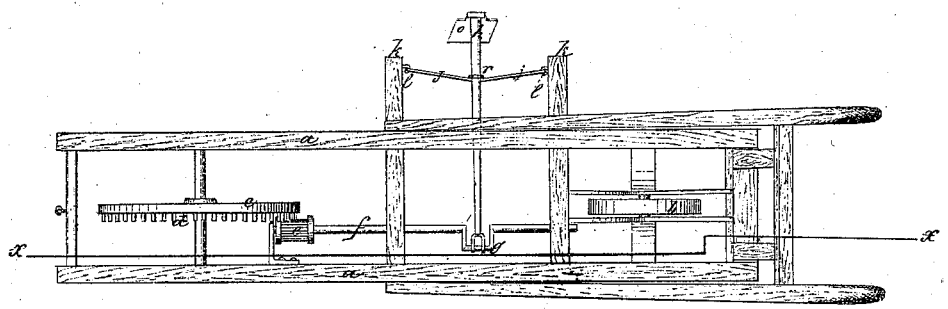
Figure 2:
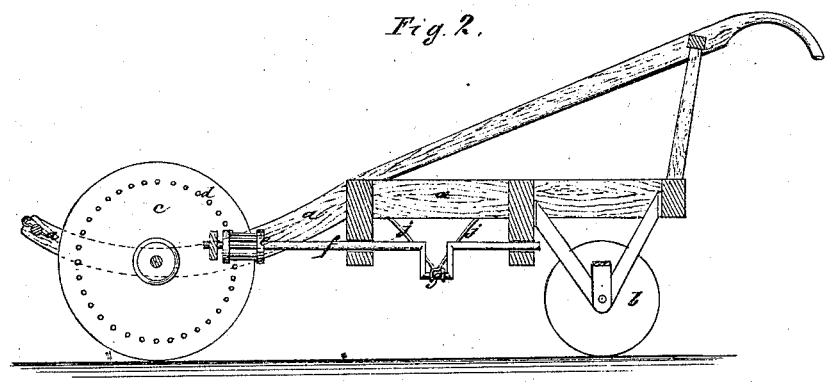

Figure 1 is a top view; and Fig. 2 is a vertical longitudinal section through the line $x\,x$.

This invention consists in providing a hoe arranged in such a manner as to work from the side of the frame for the purpose of thinning out the cotton crop.

In the drawings, $a$ is the frame; $b$, the rear wheel, and $c$ the driving-wheel, provided with teeth $d$ upon the side, which mesh into a pinion, $e$, on the shaft $f$. The shaft $f$ has the crank $g$, to which is attached the end of the hoe-handle. The hoe $h$ has a hole, $i$, in its handle, through which the wire $j$ is run. The wire $j$ has its bearings on hooks $l$ in the arms $k$, projecting from the side of the frame. The arms $k$ have perpendicular pieces at their ends, provided with a series of hooks, $l$, for the purpose of raising and lowering the bearings of the wire $j$. The blade $o$ of the hoe $h$ is made in the form of a parallelogram, having two obtuse and two acute angles. The object of constructing it in this form is to avoid wounding the plants that are intended to be left standing, which would occur if the blade were a rectangular parallelogram. When the frame is drawn forward, motion is communicated to the shaft $f$ through driving-wheel $c$ and pinion $e$. The end of the hoe-handle being attached to the crank $g$ on the shaft $f$, and hung on the wire $j$, a chopping motion is given to it.

The advantages gained by using a hoe and having it arranged to work at the side of the frame are several. It can be elevated and depressed by simply tipping the frame one way or the other, so as to work upon the hillside or pass over an obstruction. Where the cotton is thin, the hoe can be elevated in the same manner and the machine run along without lifting it from the ground. Besides these advantages, it is free from all the faults found in the cotton-hoppers heretofore used.

Having thus described my invention, what I claim as new, and desire to secure by Letters Patent, is—

The shaft $f$, driven by the center traction-wheel, $c$, arranged with the hoe $h$, suspended by wire $j$ to frame $k$, whereby the hoe may be adjusted by the driver by inclining the handles, substantially as and for the purpose set forth.

JOSEPH R. HOOD.

Witnesses:
JAMES H. GRIDLEY,
CHAS. A. PETTIT.